United States Patent [19]

Ward

[11] Patent Number: 4,867,472
[45] Date of Patent: Sep. 19, 1989

[54] WHEEL STEERING AXIS INCLINATION, CASTER, AND CAMBER ADJUSTMENT ASSEMBLY

[76] Inventor: Arlen T. Ward, 1223 9th St., Great Bend, Kans. 67530

[21] Appl. No.: 227,477

[22] Filed: Aug. 1, 1988

Related U.S. Application Data

[63] Continuation of Ser. No. 876,104, Jun. 19, 1986, abandoned.

[51] Int. Cl.$^4$ .............................................. B62D 17/00
[52] U.S. Cl. ......................................... 280/661; 403/4
[58] Field of Search ....................... 280/661; 403/1, 4; 180/253, 254; 411/535, 539, 546

[56] References Cited

U.S. PATENT DOCUMENTS

| | | | |
|---|---|---|---|
| 774,042 | 11/1904 | Cooper | 411/535 X |
| 1,332,626 | 3/1920 | Henegar | 411/539 |
| 1,492,561 | 5/1924 | Gabriel | 411/539 |
| 2,405,889 | 8/1946 | Kennedy | 57/130 |
| 4,037,680 | 7/1977 | Grove | 180/254 |
| 4,195,862 | 4/1980 | Specktor et al. | 180/253 X |
| 4,641,853 | 2/1987 | Specktor et al. | 280/661 |
| 4,684,150 | 8/1987 | Specktor et al. | 280/661 |

FOREIGN PATENT DOCUMENTS 975991 10/1950 France ................................ 411/539

*Primary Examiner*—Mitchell J. Hill
*Attorney, Agent, or Firm*—Phillip A. Rein

[57] ABSTRACT

This invention is a wheel steering axis inclination, caster, and camber adjustment assembly operable to be connected to each joint and wheel assemblies on motor vehicles and, more particularly, on a 4-wheel drive motor vehicle. The wheel caster and camber adjustment assembly includes (1) a first flange assembly; (2) a second flange assembly; (3) a connector assembly to interconnect the first flange assembly to the second flange assembly; (4) a main shim assembly to be placed between the first flange assembly and the second flange assembly to adjust camber thereof; and (5) another main shim assembly to be placed between a knuckle assembly and a spindle assembly on the vehicle to adjust SAI. The first flange assembly and second flange assembly are ring like structures having an inner portion welded to adjacent surrounding severed portions of a support housing of the wheel assemblies. The second flange assembly has openings of an elongated slot configuration so as to permit relative rotation of the first flange assembly to the second flange assembly. The main shim assembly can be of various tapered type structures so as to achieve the desired shimming adjustment of the wheel assembly up and down relative to a horizontal axis to adjust caster. Additionally, the main shim assembly may be constructed in half-shim sections having slot openings to allow adjustability and mounting of the main shim assembly without removing the connector bolts between the first and second flange assemblies.

9 Claims, 2 Drawing Sheets

WHEEL STEERING AXIS INCLINATION, CASTER, AND CAMBER ADJUSTMENT ASSEMBLY

"This is a continuation of application Ser. No. 876,104, filed June 19, 1986 now abandoned."

PRIOR ART

A search of the prior art revealed the following United States Patent:

| U.S. Pat. Reg. Nos. | Invention | Inventor |
| --- | --- | --- |
| 2,405,889 | SPINDLE ADJUSTING DEVICE | Kennedy |
| 4,037,680 | APPARATUS FOR ADJUSTING CAMBER | Grove |
| 4,195,862 | CAMBER ADJUSTING SHIM ARRANGEMENT | Specktor et al |

The Grove patent discloses a structure for adjusting camber and recognizes the problem and the necessity in the industry of being able to adjust the front wheels on 4-wheel drive vehicles. Grove teaches the use of a shim structure for the adjustment feature of camber only.

The Specktor et al patent discloses another means for adjusting camber through the use of a shim structure. In fact, Specktor et al discloses a plurality of various color coded adjustment shims constructed of a compressible type matreial.

The Kennedy patent discloses a spindle adjustment assembly utilizing cooperating wedge members having interlocking saw-tooth type teeth so that they can be rotated relative to each other and interlocked in an adjusted position. This adjustment feature is only in one direction and does not address the problem solved by the applicant's invention set forth hereinafter.

The prior art patents fail to teach the utilization of a combination means and method of adjusting both wheel SAI, caster, and camber particularly in the use of 4-wheel drive vehicles which is the new and novel feature of the applicant's invention as set forth hereinafter.

PREFERRED EMBODIMENTS

In one preferred embodiment, a wheel steering axis inclination (hereinafter referred to as SAI), caster, and camber adjustment assembly of this invention is operable to independently adjust the otuer wheel structures on 4-wheel drive vehicles so as to adjust the wheel support structures in different planes perpendicular to each other. The wheel castor and camber adjustment assembly involves the steps of first cutting as by torch, saw, or the like, a driven axle assembly and replacing it with (1) a first flange assembly; (2) a second flange assembly; (3) utilization of a main shim assembly; and (4) a connector assembly adapted to interconnect the first and second flange assemblies to each other with the main shim assembly clamped therebetween. The first flange assembly is of a circular ring type structure adapted to be welded to a portion of the severed axle assembly and having a plurality of spaced threaded openings therein. The second flange assembly is similar to the first flange assembly including a second body member with a plurality of spaced elongated openings such as slot therein. The connector assembly includes a plurality of bolt members which are inserted through respective ones of the elongated slots of the second flange assembly into the threaded openings in the first flange assembly. The use of ht elongated slots allows for the second flange assembly to be rotated relative to the non-rotatable first flange assembly to provide caster adjustment. The main shim assembly is constructed of two (2) half-shim sections, each having a plurality of connector openings therein. The spaced connector openings correspond wit the threaded openings in the first flange assembly so as to be adjustable about a vertical axis to provide SAI camber adjustment. The half-shim sections can be provided with elongated slots, inwardly extended slots, or oversized connector openings to achieve adjustment and ease of assembly. The shape of the aforementioned slots are such that the half-shim sections can be mounted between the first and second flange assemblies without removing bolt members of the connector assembly. Additionally, this allows the half-shim section to be readily replaced with ones of various thicknesses to achieve the desired adjustment of camber as required. The wheel SAI, caster, and camber adjustment assembly of this invention allows for a ready adjustment of the SAI, caster, and camber on the outer wheel assemblies of 4-wheel drive vehicles which is a problem not presently considered and solved by the prior art.

OBJECTS OF THE INVENTION

One object of this invention provides a means and method of adjusting SAI, caster, and camber on 4-wheel drive vehicles through the use of a new and novel wheel SAI, caster, and camber adjustment assembly having means thereof to adjust outer wheel assembly about vertical and horizontal axis being perpendicular to each other.

One further object of this invention is to provide a wheel SAI, caster, and camber adjustment assembly and method which is adapted to be independently connected to driven axle assemblies on drive vehicles which entails (1) cutting of the axle housing; and (2) welding to the severed axle housing first and second flange assemblies which can be provide rotational adjustment relative to each other and spacing adjustment to each other through the use of a main shim assembly.

One further object of this invention is to provide a wheel SAI, caster, and camber adjustment assembly to achieve an adjustment of outer wheel assemblies on 4-wheel drive vehicles which is a problem that has not been addressed nor solved by the prior art.

Still, one further object of this invention is to provide a wheel SAI, caster, and camber adjustment assembly operable to achieve a conversion of driven axle assemblies through the use of a kit type assembly which will provide means of SAI, camber, and caster adjustment in an efficient and effective manner.

Another object of this inveniton is to provide a wheel SAI, caster, and camber adjustment assembly which is available in kit form; relatively simple to install; easy to adjust the wheel assemblies about vertical and horizontal axes; sturdy in construction; and economical to manufacture.

Various other objects, advantages, and features of the invention will become apparent to those skilled in the art from the following discussion, taken in conjunction with the accompanying drawings, in which:

FIGURES OF THE INVENTION

Figure 1:
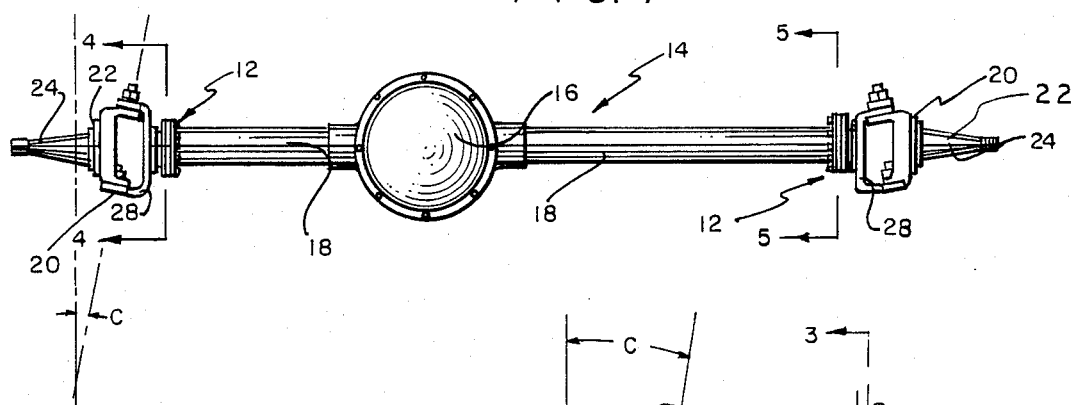
FIG. 1 is an elevational view of a wheel and axle drive assembly of a vehicle having a wheel SAI, caster, and camber adjustment assembly of this invention attached to each separate drive wheel assembly.

The following is a discussion and description of preferred specific embodiments of the new wheel SAI, caster, and camber adjustment assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail and in particular to FIG. 1, a wheel SAI, caster, and camber adjustment assembly, indicated generally at 12, is utilized on 4-wheel drive vehicles having a main differential and wheel drive assembly 14. The main wheel drive and differential assembly 14 includes a central differential housing assembly 16 which is normally driven through a conventional power drive train from an internal combustion engine. Extended from the differential housing assembly 16 on opposed sides thereof is connected a drive axle assembly 18 having wheel assemblies 20 mounted on each respective outer ends thereof.

Each drive wheel assembly 20 is provided with a wheel spindle 22 connected to a wheel drive shaft 24 and, normally, a brake assembly is mounted therein but is not shown in the drawings as does not form part of the invention.

Each joint assembly 20 includes a knuckle member 28 which is operable to hold the respective housing of the drive wheel assemblies 20. The wheel and main wheel drive and differential assembly 14 is illustrated in this invention as one embodiment of a drive assembly but it is understood that the wheel SAI, caster, and camber adjustment assembly 12 is utilized on wheel assemblies of 4-wheel drive vehicles. It is found that the triple adjustment of SAI, caster, and camber is necessary in 4-wheel drive vehicles due to unusual and necessary wear thereon and in case of repair of wrecked vehicles.

The wheel SAI, caster, and camber adjustment assembly 12 is preferably provided in a kit form having first and second flange members which are interconnected to each other and main shim members which are mountable between the first and second flange members and at the outer wheel connector flanges to achieve the desired adjustment of this invention. It is required that the drive wheel assembly 20 be severed as through a cutting process in order that the first and second flange members can be welded thereto and achieve the SAI, caster, and camber adjustment features of this invention as will be explained in detail.

More particularly, the wheel SAI, caster, and camber adjustment assembly 12 includes (1) a first flange assembly 30; (2) a second flange assembly 32; (3) a connector assembly 34 operable to interconnect the first flange assembly 30 to the second flange assembly 32; and (4) a main shim assembly 36 which is selectively mounted between the first flange assembly 30 and the second flange assembly 32 and anchored in a non-movement position on use of the connector assembly 34.

Figure 4:
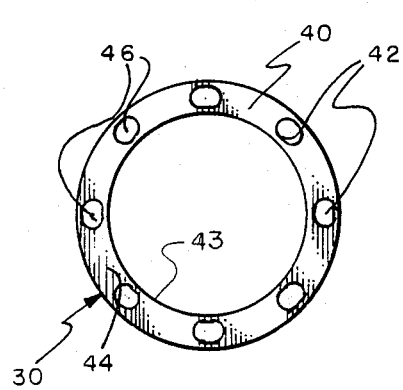
FIG. 4 is a sectional view taken along line 4—4 in FIG. 1 illustrating only a first flange assembly of the wheel SAI, caster, and camber adjustment assembly of this invention.

As noted in FIG. 4, the first flange assembly 30 includes a first body member 40 having a plurality of spaced first hole openings 42 therein. The first body member 40 is constructed of a plate material having an innersurface 43 which can be secured as by welding to the respective adjacent portion of the severed driven axle assembly 18 as noted in FIG. 2. The first body member 40 comprises a circular plate section 44 illustrated is a ring type structure.

The first hole openings 42 are provided with internal threads 46 so as to receive the connector assembly 34 therein for anchoring purposes as will be explained in detail.

Figure 5:
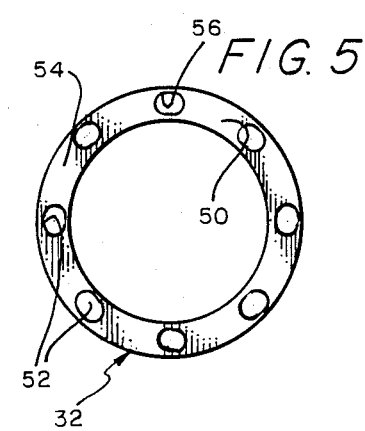
FIG. 5 is a sectional view taken along line 5—5 in FIG. 1 illustrating only a second flange assembly of the wheel SAI, caster, and camber adjustment assembly of this invention.

As noted in FIG. 5, the second flange assembly 32 includes a second body member 50 having a plurality of spaced second opening 52 therein.

The second body member 50 includes a plate section 54 of a circular ring type plate structure which is of a similar size and thickness to that of the first flange assembly 30.

The second openings 52 are preferably elongated slots each being of a width and length so as to provide for infinite rotational adjustment of the second flange assembly 32 relative to the first flange assembly 30.

Figure 6:
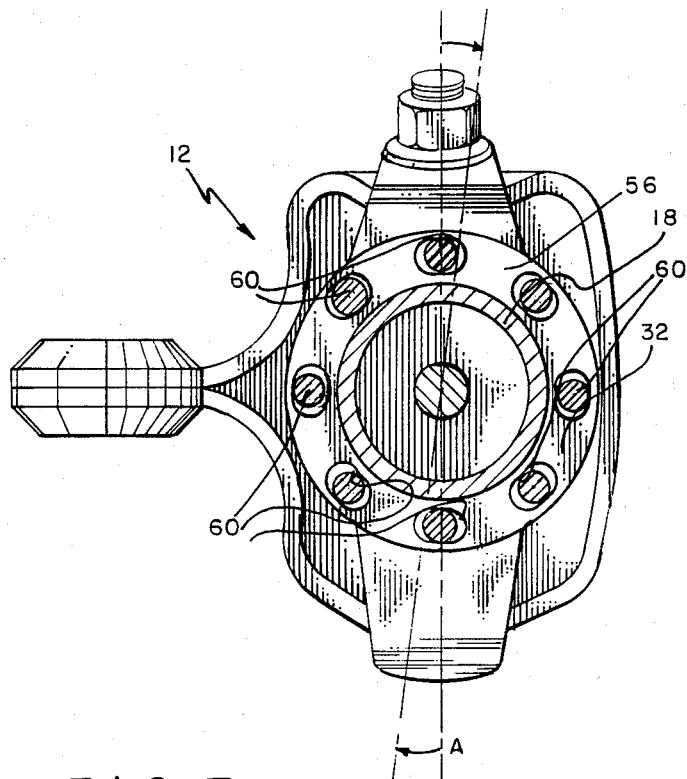
FIG. 6 is a sectional view taken along line 6—6 in FIG. 2.

The connector assembly 34 includes a plurality of bolt members 60 adapted to be placed through the elongated slots 56 in the second flange assembly 32 into the internal threads 46 of the first hole openings 42 in the first flange assembly 30. Due to the nature of the elongated slots 56, the second body member 50 is operable to be rotated relative to the first body member 40 to provide infinite adjustment and this direction which is so indicated by the letter "A" in FIG. 6. The slots 56 can be increased in number from eight (8) to twelve (12) or sixteen (16) to achieve the required adjustment feature.

Figure 2:
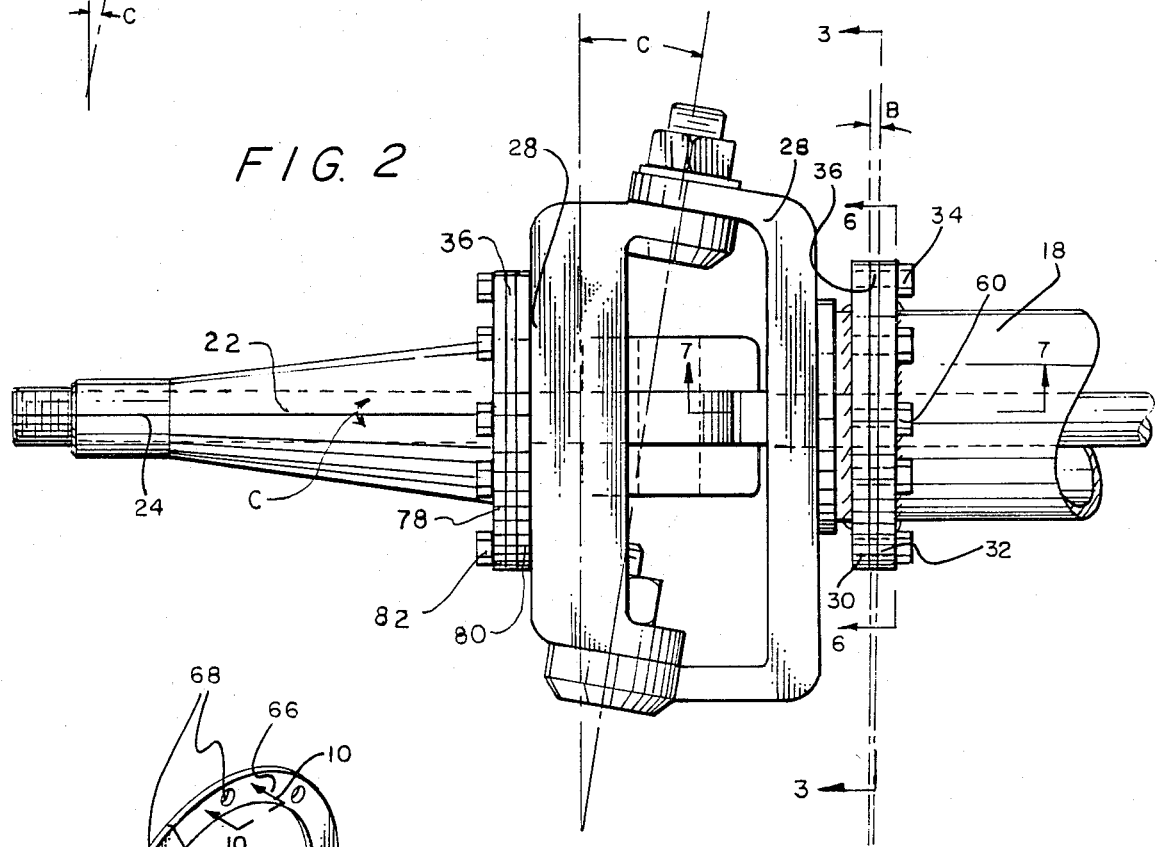
FIG. 2 is an enlarged fragmentary elevational view showing one drive wheel assembly on the vehicle having the wheel SAI, caster, and a camber adjustment assembly of this invention connected thereto.
Figure 3:
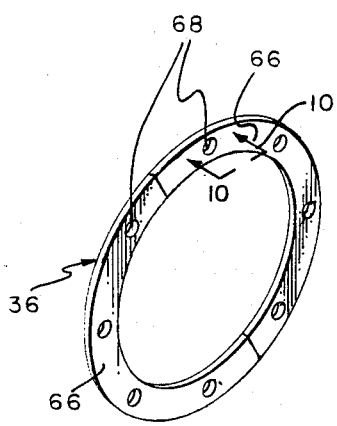
FIG. 3 is a perspective view taken along line 3—3 in FIG. 2 illustrating only a main shim assembly of the wheel SAI, caster, and camber adjustment assembly of this invention.

As noted in FIG. 3, the main shim assembly 36 can be composed of a pair of half-shim sections 66. On being placed together as noted in FIG. 3, the main shim assembly 36 resembles in size and appearance the first flange assembly 30 and the second flange assembly 32 as noted in FIGS. 4 and 5. This is necessary as the main shim assembly 36 is operable to be placed and clamped between the first flange assembly 30 and the second flange assembly 32 when being used as noted in FIG. 2 in a manner to be explained.

Figure 10:
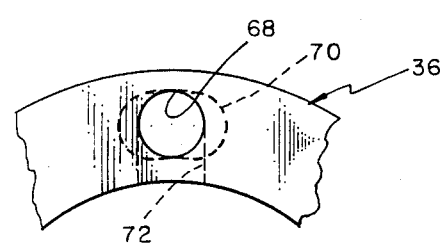
FIG. 10 is an enlarged fragmentary sectional view taken along line 10—10 in FIG. 3.

As noted in FIG. 10, each half-shim section 66 may be provided with a connector opening 68; connector slots 70; or inward slots 72 from the connector openings 68. The connector opening 68 are standard holes of a larger size than those of the first hole opening 42 in the first flange assembly 30 so as to allow rotational adjustment movement relative thereto.

The connector slots 70 may be elongated similar to the elongated slots 56 in the second flange assembly 32 to once again achieve further rotational adjustment movement.

The inward slots 72 are desirable as sllow the half-shim sections 66 to be removed and replaced from between the adjacent clamped portions of the first flange assembly 30 and the second flange assembly 32 without removing the bolt member 60 of the connector assembly 34 from the internal threads 46 of the first hole openings 42.

the steering axis inclination or SAI, indicated by letter "C" in FIGS. 1 and 2, may be adapted as determined necessary with the adjustment of camber noted as letter "B" using the main shim assembly 36. The SAI adjustment is achieved by the use of another main shim assembly 36 mounted between adjacent flange members 78 and 80 which are interconnected by anchored bolt members 82. This subject main shim assembly 36 may be constructed as shown in FIG. 3 and letter "B" being of various thicknesses and tapered to achieve the desired adjustment.

The SAI is adjusted as needed with or without the cmber adjustment at the first and second flange assemblies 30, 32. The combined angle of SAI and camber is a "joining angle" set up to eliminate "scrub radius" or known as the forward and backward movement of the wheels while turning which creates hazardous tire wear.

The opposing wheel drive shafts 24 should be adjusted with SAI angles at least 1% within each other for the proper turning radius and the camber adjustment "B" at their respective correct settings.

USE AND OPERATION OF HTE INVENTION

In the use and operation of the wheel SAI, caster, and camber adjustment assembly 12 of this invention, it is noted that one (1) subject assembly is necessary for each of the differential and wheel assemblies 24 on the vehicle to which this invention is being applied in order to adjust both caster and camber for each wheel assembly. It is noted that the caster adjustment is achieved by rotating the knuckle structure forwards or backwards and rotating the wheel as shown by the adjustment "A" in FIG. 6. The camber adjustment, as noted by letter "B" in FIG. 2, is achieved through the use of the main shim assembly 36 as will noted. The SAI adjustment as noted by the letter "C" uses a main shim assembly 36 which is a ball joint assembly adjustment.

First, the operator needs to take and record certain measurements on the vehicle before proceeding. These measurements would include (1) vehicle riding height; (2) the drive line angle; and (3) the frame angle. The operator needs to determine the ideal caster angle for the subject vehicle and is now ready to initiate the disassembly process. The operator should measure the existing camber and chamber measurements of the axle structure in order to measure and achieve the angles of caster and camber to be achieved in the final result.

Next, the user of this invention would normally place the vehicle, and more particularly,the vehicle wheels on jackstands and remove the wheel, brake assemblies and spindles. Then, the elongated wheel axle members 18 and the housing thereabout are severed through the use of a cutting torch or saw before adding the flange assemblies of this invention.

Figure 7:
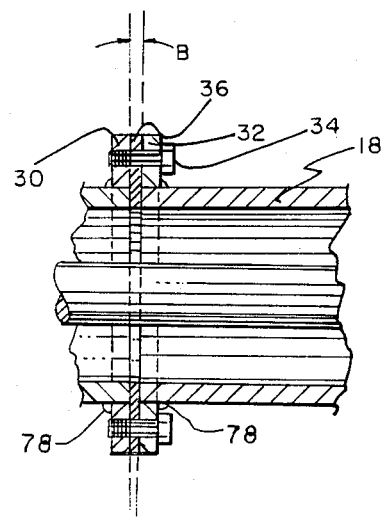
FIG. 7 is a fragmentary sectional view taken along line 7—7 in FIG. 2.

The first assembly step would be to apply the first flange assembly 30 and the second flange assembly 32 to the adjacent portions of the severed housing of the main wheel drive and differential assembly 20. this attachment can be achieved through a normal welding process as shown by welds 78 in the interconnection of the severed housing 18 as noted in FIG. 7.

Next, the severed spaced first flange assembly 30 and the second flange assembly 32 are interconnected through the connector assembly 34 having the bolt members 60 inserted through the second openings 52 and inot the internally threaded first hole openings 42. It is noted that eight (8) bolt members 60 and openings 42, 52 for such function but it is obvious that 10 12, or 16 may be utilized. The important feature is to provide the elongated slots 56 in the second flange assembly 32 to provide the required adjustment thereof.

Now, it is obvious that the knuckle members 28 having the first flange assembly 30 connected thereto can be rotated to move the first flange assembly 30 relative to the stationary second flange assembly 32. This rotational movement is indicated by the letter "A" in FIG. 3 and is known as a caster adjustment. THis adjustment is needed to provide for proper steering and wear of the tire member on the subject vehicle. It is obvious that an infinite amount of adjustment can be achieved on proper positioning of the slots 56 thus covering half of the area so that, if it appears that an adjustment cannot be made, the entire interconnected wheel assembly 20 and the first flange assembly 30 can then be moved to an adjacent one of the bolt members 60 so as to achieve complete adjustment.

The adjustment "B" being for camber is achieved by using the shim assembly 36 of a size as noted by letter "B" in FIG. 2. The main shim assembly 36 with the half-shim sections 66 can be constructed of various taper and thicknesses so as to provide for the up and down movement of the outer wheel spindle 22 and the wheel shaft 24 as noted by an arrow "C" in FIG. 2. On reaching the desired camber angle "B", it is obvious that the bolt members 60 can be tightened so as to achieve a rigid and solid structure with the desired angular adjustments of caster and camber being "A" and "B", respectively.

The SAI adjustment is achieved by use of the main shim assembly 36 between the flange members 78, 80. This allows independent adjustment of the outer respective wheel spindels 22 relative to each other and to the knuckle members 28. This adjusts the scrub radius which is important on turns.

As noted in FIG. 10, the half-shim sections 66 may be provided with the connector slots 70 or the inward slots 72 from the holes 68 so that the half-shim sections 66 can be mounted on the already installed bolt members 60 without removing same.

Figure 8:
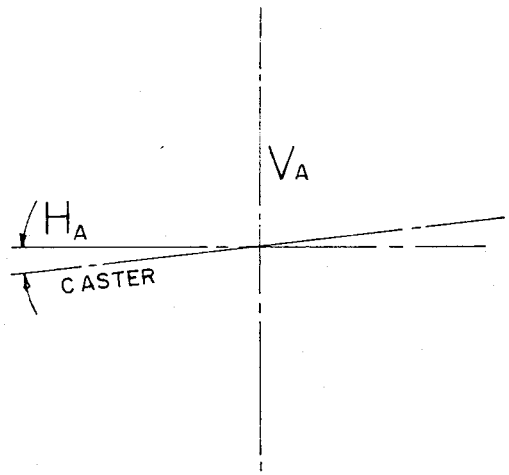
FIGS. 8 and 9 are schematic diagrams illustrating the SAI, caster, and camber adjustment features of this invention.

As noted in FIG. 8, the "caster" and "SAI" required adjustment is an up and down adjustment about a horizontal axis (HA) an achieved through the use of the main shim assemblies 36 to achieve adjustment at "B" and "C".

Figure 9:
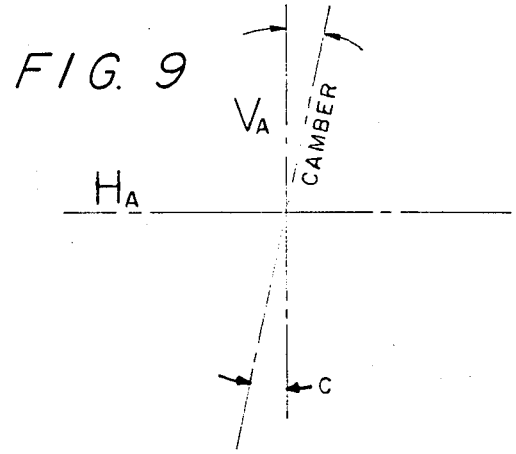

As shown in FIG. 9, which is a top plan view of the vertical and horizontal axes, the "camber" required adjustment is achieved by rotation of the innerconnected joint wheel assembly 20 with the first flange assembly 30 secured thereto. On loosening of the bolt members 60,it is obvious that this interconnected front wheel assembly 20 can be rotated to achieve the desired caster adjustment "A" as noted in FIG. 6. The bolt members 60 are tightened in the adjusted position to anchor the respective wheel assembly 20.

This invention also relates to a method of altering drive wheel assemblies 20 on vehicles so as to provide adjustment of SAI, caster, and camber. The method has been described as involves (1) cutting the housings of the drive wheel assemblies 20; (2) mounting the first flange assembly 30 on a first portion of the severed housing; (3) mounting the second flange assembly 32 on a second adjacent portion of the severed housing; (4) inserting the shim assembly 36 between the first flange assembly 30 and the second flange assembly 32; (5) clamping with the connector assembly 34 the first flange assembly 30 to the second flange assembly 32; and 6) adjusting the angle of wheel spindle members 22 with use of a shim assembly 36.

The method further involves rotating the first flange assembly 30 relative to the second flange assembly 32 for an adjustment feature. Additionally, the spacing between the first flange assembly 30 and the second flange assembly 32 can be varied by use of the shim assembly 36.

It is noted that the wheel SAI, caster, and camber adjustment assembly of this invention is utilized on each wheel drive assembly in order to achieve the required individual adjustment thereof. This achieves the appropriate traction and trailing of the motor vehicle with the least amount of wear on bearings and tire structures especially during turning maneuvers.

It is seen that the wheel SAI, caster, and camber adjustment assembly of this invention is readily sold with instructions in a kit form; is rather simple to mount with a minimum amount of skill and special tools required; and is easily adjusted to satisfy the minute adjustments of caster and camber that is required.

When changing camber with the shim members as noted by letter "B", the SAI as noted by letter "C" is automatically altered. The SAI combined with camber angle makes another angle called the "combined angle" and this is for strictly tire wear and vehicle control angle.

While the invention has been described in conjunction with preferred specific embodiments thereof, it will be understood that this description is intended to illustrate and not to limit the scope of the invention, which is defined by the following claims.

I claim:

1. A method of adjusting camber and caster on wheel assemblies on vehicles embodying the steps of:
    (a) severing a driven axle housing member on said wheel assembly into adjacent severed portions;
    (b) securing a first flange assembly to one of the adjacent severed housing portions;
    (c) connecting a second flange assembly to another of the adjacent severed portions of the wheel assembly; and
    (d) rotating said first flange assembly relative to said second flange assembly to achieve adjustment of the caster thereof.

2. A method of adjusting caster and camber in a vehichle as described in claim 1, including:
    (a) inserting a main shim assembly between said first flange assembly and said second flange assembly so as to achieve adjustment about a vertical axis being camber adjustment.

3. A method for adjusting caster and camber in a vehicle as described in claim 1, wherein:
    (a) regulating the taper and thickness of said main shim assembly to achieve desired camber adjustment.

4. A method for adjusting caster and camber in a vehicle as described in claim 1, wherein:
    (a) providing elongated holes and slots in said first flange assembly and said second flange assembly to provide infinite rotational adjustment therebetween for caster adjustment.

5. A method for adjusting SAI, caster and camber in a vehicle as described in claim 1, wherein:
    (a) inserting another main shim assembly between a knuckle assembly and a spindle member on the wehicle to adjust SAI.

6. A method of adjusting camber and caster on wheel assemblies on vehicles embodying the steps of:
    (a) severing a driven axle housing member on said wheel assembly into adjacent severed portions;
    (b) providing a wheel drive assembly having a first flange assembly;
    (c) connecting a second flange assembly to one of the severed housing portions
    (d) rotating said first flange assembly relative to said second flange assembly to achieve adjustment of the caster thereof; and
    (e) connecting said first flange assembly to said second flange assembly 7. A method of adjusting caster and camber in a vehicle as described in claim 6, including:
    (a) inserting a main shim assembly between said first flange assembly and said second flange assembly so as to achieve adjustment about a vertical axis being camber adjustment.

8. A method for adjusting caster and camber in a vehicle as described in claim 6, wherein:
    (a) providing elongated holes and slots in said first flange assembly and said second flange assembly and said second flange assembly to provide infinite rotational adjustment therebetween for caster adjustment.

9. A method for adjusting SAI, caster and camber in a vehicle as described in claim 6, wherein:
    (a) inserting another main shim assembly between a knuckle assembly and a spindle member on the vehicle to adjust SAI.

* * * * *